Figure 1:
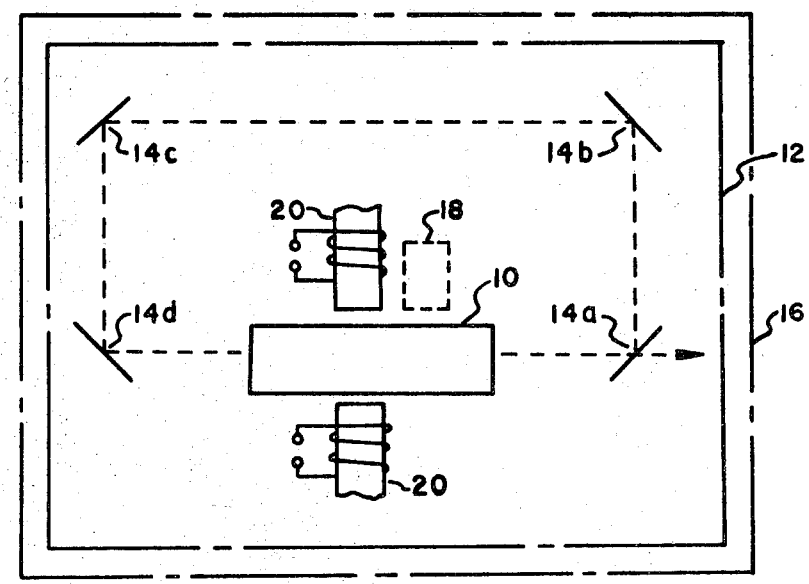

United States Patent

[11] 3,557,370

[72] Inventors  Lawrence J. Piekenbrock
                Longmont;
                Edward Camp Tibbals, Jr., Boulder, Colo.
[21] Appl. No.  705,417
[22] Filed      Feb. 14, 1968
[45] Patented   Jan. 19, 1971
[73] Assignees  Alexander Dawson, Inc.
                Mahwah, N.J.
                a corporation of Delaware. by mesne
                assignments;

[54] GAMMA RAY LASER HAVING A LOW
     TEMPERATURE CLOSED RESONATING CAVITY
     6 Claims, 2 Drawing Figs.
[52] U.S. Cl. ................................................. 250/84,
                                                    331/94.5
[51] Int. Cl. ................................................. H01s 4/00,

[50] Field of Search ......................................... 250/84;
                                                    331/94.5

[56]                References Cited
                UNITED STATES PATENTS
3,233,107  2/1966  Senett ........................... 250/84
3,234,099  2/1966  Baldwin et al. ................ 250/84
3,281,600  10/1966 Vali et al. ..................... 250/84

Primary Examiner—Archie R. Borchelt
Attorneys—Albert C. Johnston, Robert E. Isner, Lewis H. Eslinger, Alvin Sinderbrand ABSTRACT: Gamma ray laser device, wherein a coherent beam of gamma radiation is generated through stimulation of gamma transitions in excited atomic nuclei in a biologically shielded and low temperature closed resonating cavity, and wherein said atomic nuclei are externally excited by subjection thereof to radiation produced by electron decomposition.

INVENTORS
LAWRENCE J. PIEKENBROCK
AND EDWARD CAMP TIBBALS JR.
BY. Robert E. Lowe
ATTORNEY.

GAMMA RAY LASER HAVING A LOW TEMPERATURE CLOSED RESONATING CAVITY

This invention relates to methods and devices for the production of coherent beams of ultrahigh frequency electromagnetic radiation and particularly to methods and devices for generating a coherent beam of gamma radiation of energy greater than 1 kilo electron volt.

To date, the field of operation of lasers and masers has been limited to the generation of light of wave lengths below the near ultraviolet range or of even longer wavelength light, heat and microwaves. In such devices, operability is dependent upon the stimulated emission of radiation from the electron shells surrounding the atom and such electron shell emission poses an inherent obstacle to the production of coherent ultrahigh frequency radiation of the type herein of concern.

This invention, in its broad aspects, employs the utilization of stimulated emission from the nucleus of the atom to effect the generation of a coherent beam of gamma rays which have wavelengths that are several orders of magnitude shorter than the wavelengths currently generated by conventional laser devices. Such gamma radiation inherently possesses an energy content that is several orders of magnitude greater than the energy content of radiation generated by conventional lasers. In its more narrow aspects, the subject invention includes method and apparatus for externally exciting atomic nuclei by radiation produced by electron decomposition to stimulate gamma transitions therein and to produce gamma radiation in a biologically shielded and low temperature closed resonating cavity through matching the emission process gamma transition energies to the absorption process gamma transition energies.

Among the advantages attendant the practice of the subject invention is the utilization of coherent gamma radiation in a focused beam for use either directly or as a trigger in varied fields which require or could utilize extremely rapid rates of release of tremendous quantities of energy, either in discrete bursts or at predetermined, periodically spaced intervals.

The principle object of this invention is the provision of a novel and improved method and apparatus for effecting the generation of coherent beams of gamma rays of energy of greater than 1 kilo electron volt by means of subjecting atomic nuclei to radiation produced by electron decomposition to stimulate gamma or transitions therein.

Another object of this invention is the provision of a gamma ray laser device that may be utilized directly or as a trigger to effect the rapid release of tremendous quantities of energy in a predetermined manner. Other objects and advantages of the subject invention will become apparent from the following portions of this specification and from the appended drawings which illustrate, in accordance with the dictates of the patent statues, the essentials of presently preferred apparatus incorporating the principles of the invention and in which FIG. 1 is a schematic representation of essential components of apparatus for generating a coherent beam of gamma radiation of the general character described above.

Figure 2:
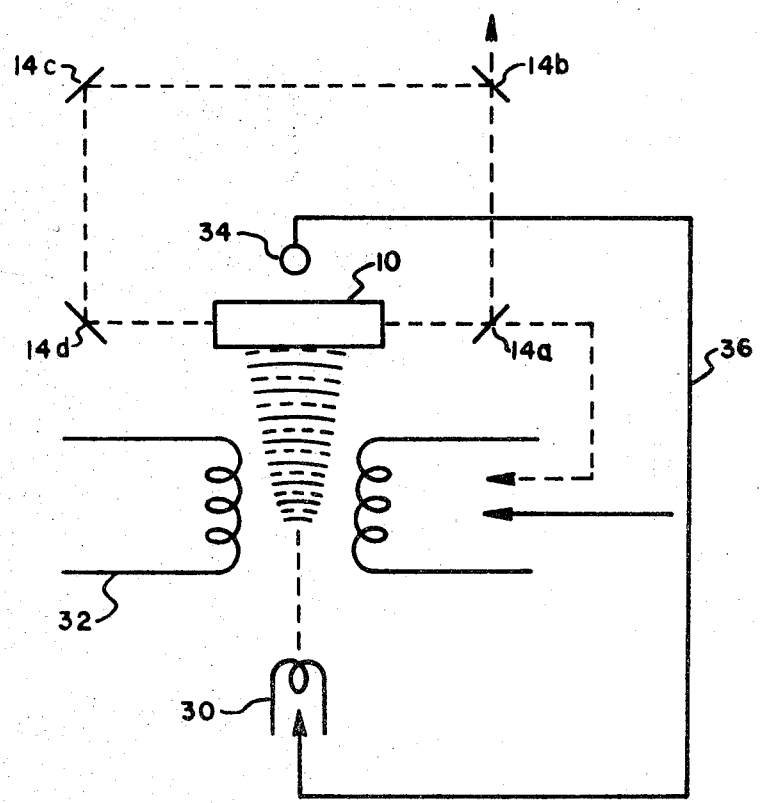

FIG. 2 is a schematic representation of the utilization of a device of the type shown in FIG. 1 in association with apparatus for generating radiation by electron decomposition.

As schematically illustrated in FIG. 1, there is provided a source of gamma radiation 10, in which gamma transitions in excited atomic nuclei produce gamma radiation, a plurality of reflecting mirror members, such as the Bragg reflection mirrors 14a to 14d to define a closed circuit resonator cavity within which the emitted gamma rays are contained to reenter the source 10 and to thereby stimulate additional gamma transitions in excited atomic nuclei and means 20 for subjecting the atomic nuclei to selective magnetic and/or high frequency electromagnetic fields for matching the emission process gamma transition energies to the absorption process gamma transition energies. All of the above named components are enclosed within a cryostat, as generally designated by the dotted line 12, which in turn is surrounded by appropriate biological shielding means, generally designated by the dotted line 16. The following will serve to outline the theoretical basis for the operation involved and to define the parameters that affect the same.

In order to sustain oscillation in a laser, it is necessary that the following equation be satisfied:

$$e^{2(\alpha l - \beta l)} \geq \frac{1}{R} \qquad (1)$$

where:

$\alpha = g_1/g_2 \sigma \Delta n$: is the gain/cm.
$\beta = $ Loss/cm.: due to scattering, etc.
$g_1 g_2 = $ Statistical weights of lower and upper levels
$l = $ Length of the active medium
$\sigma = $ Absorption cross section
$\Delta N = N_2 - \frac{g_1}{g_2} N_2$ is the inverted population
$N_1 N_2 = $ Population of lower and upper levels.

In radioactive decay, we can represent the population of the upper level by $$N_2 = R \lambda_2 e^{-\lambda_2 +} \qquad (2)$$

where:

$A = $ Initial activity in disintegration/sec. $\qquad (3)$
$\tau_2 = $ Half life of the second level
$\lambda_2 = 1/\tau_2$.

If we assume $\tau_2 \gg \tau_1$
then: $\qquad N_2 \gg N_1$, and $$\Delta N \simeq N_2 = A \lambda_2 e^{-\lambda_2 t} = \frac{A}{\tau_2} e^{-t/\tau_2} \qquad (4)$$

furthermore:

$$\sigma = 9 \frac{\lambda_0^2}{8\pi} \frac{T^2}{(h\nu_0 - h\nu)^2 + T^{2/4}} \qquad (5)$$

where:

$T = \hbar \lambda(t)$
$9 = $ Statistical factor
$T = .693$
$\lambda_0 = $ Wave length of relevant radiation
$\epsilon = h\nu_0 - h\nu = $ difference in energy of incident radiation and the energy of the excitation.

From equation 1 we obtain:

$$\alpha \geq \frac{1}{2l} \ln \frac{1}{R} + \beta \qquad (6)$$

$$\sigma \geq \frac{g_2}{g_1} \frac{1}{\Delta n} \left\{ \frac{1}{2l} \ln \frac{1}{R} + \beta \right\} \qquad (7)$$

with:

$a = 1.239 \times 10^{-4}$ cm.-ev.
$b = .693 \times 6.56 \times 10^{-16}$ ev.-sec.

we obtain:

$$\frac{g_a^2 b^2}{E_0^2 8\pi \tau_2^2 [\epsilon^2 + b^2/\tau_2^2]} \geq \frac{'g_2}{g_1 \Delta n} \left\{ \frac{1}{2l} \ln \frac{1}{R} + \beta \right\} \qquad (8)$$

with:

$$\Delta n = \frac{R}{\tau_2} e^{-t/\tau_2} \qquad (9)$$

and:

$$c^2 = g \frac{g_1}{g_2} \frac{a^2 b^2}{8\pi}$$

results in:

$$\frac{c^2 A e^{-t/\tau_2}}{E_o^2 [T_2^3 \epsilon^2 + b^2 T]} \left\{ \frac{1}{2l} \ln \frac{1}{R} + \beta \right\} \geq 1 \qquad (10)$$

The fraction of recoilless transition of gamma rays is approximately represented by:

$$f = \exp \left\{ -\frac{3}{2} \frac{R}{k\theta_D} \left( \frac{4\phi(x)}{x} + 1 \right) \right\}$$

where:

$$x = \theta_D / t$$

and:

$$\phi(x) = \frac{1}{x} \int_0^x \frac{t d\xi}{e^\xi - 1}$$

$\theta_D = $ Debye temperature
$E_r = $ The recoil energy
$T = $ The temperature in °K.

In order to maximize this expression, the Debye temperature should be as large as possible and the operating temperature should be small with respect to the Debye temperature.

The Zeeman effect produced by magnetic field gradients and/or the high frequency electromagnetic fields generated in the component 20 in effect produce emission and absorption energy line broadening which is used to minimize $\epsilon$ in equation 10, and hence to maximize the realizable gain. It can be observed from the final equation 10, that the following parameters are involved:

$c$ is a constant;
$A$ is the activity of the gamma ray source 10;
$e$ is the base of the natural log system;
$t$ is the time;
$\tau$ is the half life of the state in question;
$E_0$ is the transition of the state in question;
$\epsilon$ is the difference between emitted and absorbed gamma ray energy;
$b$ is a constant;
$l$ is the length of the active media;
$R$ is the product of the reflectivities of the Bragg mirrors creating the resonant cavity;
$\beta$ is the loss per centimeter.

It is readily seen that if the reflectivities of the Bragg mirrors are one, and the loss is zero, the total quantity on the left becomes large, thereby satisfying the equation. It can also be readily seen that if the half life $\tau$ is small, along with the energy difference $\epsilon$, this will also help satisfy the equation. The equation also serves to define the basic requirements for source nuclei and thus permits selection of suitable materials that have attainable limits for $E$, $l$, $R$ and $\beta$.

In the above described device, the gamma ray source 10 may suitably constitute a high purity crystal of radioactive material, or combination thereof, having a high curie temperature so as to provide a relatively high degree of recoilless emission of gamma rays. Additionally, the material utilized should be of such character that is not susceptible to electron and molecular interactions with applied magnetic fields to thereby minimize, if not avoid, all induced heating. The particular material employed must also have a metastable level appropriate to the particular mode of operation and to effect the emission of gamma radiation through transitions from the metastable state to a lower energy level. In order to effectively achieve the latter, the crystal should desirably be of highest obtainable purity so as to minimize, if not avoid, internal losses of appreciable magnitude that otherwise inherently occur due to the presence of substantial amounts of impurities within. Included among suitable radioactive materials useable as the gamma ray source 10 is $Sn^{119m}$, which possesses the necessary properties to satisfy the above requirements and which has a half life in the order of eight days. With such a material, the percentage of effectively recoilless emission of gamma rays during the transition from the metastable rate to a lower energy level is effectively increased by operating at low temperatures, for example, in the order of 10° Kelvin, within the cryostat 12.

In order to compensate for the energy differences which are normally attendant losses occurring during or subsequent to gamma ray emission, the emission process gamma transition energies are matched to the absorption process transition energies by subjecting the gamma ray source 10 to the action of a controlled magnetic field. This field may be of uniform character, or may be designed to provide a predetermined field gradient in accordance with the exigencies of a given installation. If a nonoscillating magnetic field is employed, internal energy level matching between emitting and absorbing nuclei in the active source material is effected by means of the Zeeman effect. Alternatively, such internal energy level matching can be effected by exposing the source 10 to electromagnetic field which functions to achieve effective line broadening and hence an increase in stimulated emission when the recoilless emission and absorption peaks are very narrow and close together Either or both types of energy level matching techniques may be utilized in any given installation.

In order to effect the necessary gain within the system, the emitted gamma radiation is reflected within a closed resonator cavity bidirectionally through the gamma ray source 10. Such desired reflection of the gamma radiation is effected by a plurality of Bragg reflection mirrors so arranged and positioned as to provide the requisite closed circuit defining the resonator cavity. Although four such mirrors are schematically illustrated, a greater number may be required and such will be determined by the frequency of the particular gamma radiation involved and the particular material of which the mirrors are made. The mirrors per se are constituted by crystals in which the crystal planes are free from internal defects and may be suitably constituted by pure germanium or silicon crystals. The mirrors are mounted in a so-called "puckered" arrangement as disclosed in "Resonator For An X-Ray Laser" by Bond, Duguay and Rentzepis, Applied Physics Letters, Vol. 10 No. 8, April 15, 1967. Each of the crystal mirrors must be mounted so as to permit the adjustment of the positioning thereof, and their initial positioning may be determined by x-ray diffraction techniques. Likewise focusing of the beam may be effected by physical warping of the mirror elements.

As will be apparent, one of the mirrors, for example the mirror 14a, must be so constructed as to permit a portion of the coherent gamma ray beam to escape the resonant cavity and to exit from the device.

In a unit as above described, the gamma ray source 10 is of such character as not to require the application of any external excitation in order to effect the desired degree of transition from the metastable stable to the lower energy level. That is, the source material employed is possessed of a sufficient inverted population at the metastable state to provide, by stimulated emission, a sufficient gain to establish a coherent beam output.

As an alternative to the above, the subject device may include means 18 for externally exciting the source material to provide the necessary inverted population. One such means may comprise an auxiliary source of neutrons or other pumping mechanism to provide sufficient additional electromagnetic energy as to establish the necessary inverted population required to produce a stimulated gain as described above. With the use of such external excitation, a different selection and possible greater variety of gamma ray source materials are available for use. The characteristics of suitable source materials useable with external excitation include source materials of general character set forth above, together with materials of much shortened half life of the metastable state as determined by the amounts of pumping energy available. If a neutron source is employed for external excitation, such source, which suitably could comprise a nuclear reactor, should be adapted to provide the necessary quantities of thermal neutrons. When external excitation is employed the device will generally operate in a cyclic manner emitting bursts of energy at periodic intervals.

FIG. 2 schematically illustrates the association of a device of the type illustrated in FIG. 1 with apparatus adapted to supply radiant energy generated by the gamma ray source 10. As shown, there is provided means 30 for emitting a stream of high energy electrons, suitably an electron gun assembly. The stream of high energy electrons emitted from the source 30 is directed through an ultrahigh frequency oscillating magnetic field toward conductor target 34. The target conductor is connected by suitable energy transfer means 36 to both the electron source 30 and also to the generator means 32 for the magnetic field. In operation of the described device and with the frequency of the oscillating magnetic field set at a critical value between $10^{10}$ and $10^{14}$ cycles per second, the emitted electrons will be transmuted into positive and negative energy waves of discrete character as generally designated by the arcuate wave fronts 40. The negative energy waves are believed to be of conventional electromagnetic character and constitute gamma radiation of a particular character.

If, as illustrated, the gamma ray source 10 is disposed in the path of such radiation, the energy content thereof can be used in lieu of the neutron source to provide the requisite external excitation energy to create an inverted population of magnitude necessary to effect and maintain stimulated emission and high gain operation.

When so combined the gamma ray laser will in effect function as an energy conversion device wherein the gamma radiation source 10 absorbs the energy emanating from the electron decomposition device and converts it to coherent, monochromatic, collinear focused form.

As now will be apparent to those skilled in this art, the above described method and device may be utilized in a great number of diverse applications. In one aspect, the device may generally be thought of as an energy storage system capable of very rapid release rates. In other words, it can be viewed as a type of supercapacitor where the energy is released in the form of coherent gamma radiation. For instance, calculations indicate that when a one curie source of $Sn^{119m}$ is stimulated, it will release its entire energy in a period of less than 100 nanoseconds, thereby providing an energy source of approximately 30,000 megawatts, which is at least 30 times the energy release obtained from large pulsed ruby lasers. Such high energy release rates could be employed for useful purposes such as for interception and destruction of missiles, tunneling through mountains, well drilling, and for road and canal building projects and the like. The coherent nature and wavelength of the emitted radiation also lends itself to numerous instrumentation oriented utilizations such as extremely accurate measurements of distance, time, velocity, and the like through adaption of interference techniques already in existence for optical lasers. In addition, and through means of holographic methods, magnifications on the order of 100 times that which may be achieved in electron microscopes are possible. Another major area of utilization for such a high intensity energy source would be the exciting of plasma and the triggering of other energy releasing nuclear reactions through controlled fusion or fission. In comparison with techniques presently being investigated for producing controlled fusion reactions, systems utilizing devices of the type herein disclosed would be relatively straightforward and less expensive to build.

We claim:

1. In the method of producing coherent gamma radiation the steps of stimulating gamma transitions in excited atomic nuclei to produce gamma radiation in a closed resonating cavity, matching the emission process gamma transition energies to the absorption process gamma transition energies, and externally exciting said atomic nuclei to create a population inversion at a metastable state by subjecting the same to radiation produced by electron decomposition.

2. The method as set forth in claim 1 wherein said atomic nuclei are subjected to electromagnetic radiation produced by electron decomposition.

3. The method as set forth in claim 1 wherein said atomic nuclei are subjected to positive energy radiation produced by electron decomposition.

4. Apparatus for producing coherent gamma radiation comprising:
    crystal means adapted to produce gamma transitions in excited atomic nuclei;
    means to match emission process gamma transition energies to absorption process gamma transition energies;
    means for selectively directing emitted gamma radiation within a closed circuit resonating cavity for stimulating additional gamma transitions to effect emission of coherent gamma radiation; and
    means for externally exciting said crystal means to create a population inversion as a metastable state by subjecting said crystal means to radiation produced by electron decomposition.

5. Apparatus as set forth in claim 4 wherein said crystal is subjected to electromagnetic radiation produced by electron decomposition.

6. Apparatus as set forth in claim 4 wherein said crystal is subjected to positive energy radiation produced by electron decomposition.

UNITED STATES PATENT OFFICE
CERTIFICATE OF CORRECTION

Patent No. 3,557,370    Dated Jan. 19, 1971

Inventor(s) Lawrence J. Piekenbrock and Edward Camp Tibbals

It is certified that error appears in the above-identified patent and that said Letters Patent are hereby corrected as shown below:

IN THE SPECIFICATION:

Column 1, line 53, "statues" should read -- statutes

Column 2, line 16, "$\dfrac{g_1}{g_2} N_2$" should read -- $\dfrac{g_2}{g_1} N_2$ --;

line 21, "$R\lambda_2 e^{-\lambda 2+}$" should read -- $R\lambda_2 e^{-\lambda_2 t}$ --;

line 32, "$T^{2/4}$" should read -- $T^2/4$

Column 4, line 1, "together" should read -- together.

line 31, "stable" should read -- state --.

Signed and sealed this 9th day of May 1972.

(SEAL)
Attest:

EDWARD M. FLETCHER, JR.
Attesting Officer

ROBERT GOTTSCHALK
Commissioner of Patents